US010521585B2

(12) United States Patent
Cheng et al.

(10) Patent No.: US 10,521,585 B2
(45) Date of Patent: Dec. 31, 2019

(54) METHOD AND APPARATUS FOR DETECTING SIDE-CHANNEL ATTACK

(71) Applicant: Baidu USA LLC, Sunnyvale, CA (US)

(72) Inventors: Yueqiang Cheng, Sunnyvale, CA (US); Tao Wei, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 191 days.

(21) Appl. No.: 15/722,834

(22) Filed: Oct. 2, 2017

(65) Prior Publication Data

US 2019/0102546 A1  Apr. 4, 2019

(51) Int. Cl.
| | |
|---|---|
| *G06F 21/60* | (2013.01) |
| *G06F 12/0891* | (2016.01) |
| *G06F 21/00* | (2013.01) |
| *G06F 12/14* | (2006.01) |
| *G06F 21/55* | (2013.01) |
| *G06F 21/53* | (2013.01) |
| *G06F 21/75* | (2013.01) |
| *H04L 29/06* | (2006.01) |
| *G06F 21/74* | (2013.01) |
| *G06F 1/24* | (2006.01) |

(52) U.S. Cl.
CPC ............ *G06F 21/556* (2013.01); *G06F 21/53* (2013.01); *G06F 21/74* (2013.01); *G06F 21/75* (2013.01); *H04L 63/1425* (2013.01); *H04L 63/1466* (2013.01); *G06F 2221/034* (2013.01)

(58) Field of Classification Search
CPC ........ G06F 21/556; G06F 21/53; G06F 21/74; G06F 21/75; G06F 2221/034; H04L 63/1425; H04L 63/1466
See application file for complete search history.

(56) References Cited

U.S. PATENT DOCUMENTS

| | | | | |
|---|---|---|---|---|
| 10,204,229 | B2* | 2/2019 | Hoogerbrugge | ...... H04L 9/0897 |
| 2012/0159184 | A1* | 6/2012 | Johnson | .............. G06F 21/6218 713/189 |
| 2013/0159726 | A1* | 6/2013 | McKeen | .................. G06F 21/72 713/189 |
| 2013/0198853 | A1* | 8/2013 | McKeen | .................. G06F 21/72 726/26 |

(Continued)

OTHER PUBLICATIONS

Chen, Sanchuan, et al. "Detecting privileged side-channel attacks in shielded execution with Déjá Vu." Proceedings of the 2017 ACM on Asia Conference on Computer and Communications Security. ACM, 2017. (Year: 2017).*

(Continued)

*Primary Examiner* — Michael Simitoski
(74) *Attorney, Agent, or Firm* — Seed Intellectual Property Law Group LLP

(57) ABSTRACT

Embodiments of the present disclosure disclose a method and apparatus for detecting a side channel attack. An embodiment of the method comprises: clearing data in a state save area of a target enclave; sequentially executing an instruction sequence in the target enclave; acquiring data in the state save area; and in response to determining that the acquired data in the state save area indicates that an asynchronous enclave exit with a cause of exception exit happens to the target enclave, determining that the side-channel attack to the target enclave exists. The embodiment implements detecting a side channel attack to the enclave without additional hardware.

20 Claims, 7 Drawing Sheets

(56) References Cited

U.S. PATENT DOCUMENTS

| | | | |
|---|---|---|---|
| 2016/0044059 A1* | 2/2016 | Fine | H04L 63/1416 |
| | | | 726/23 |
| 2017/0083724 A1* | 3/2017 | Chhabra | G06F 21/72 |
| 2017/0177457 A1* | 6/2017 | Swanson | G06F 1/24 |
| 2018/0046808 A1* | 2/2018 | Cammarota | G06F 12/0877 |

OTHER PUBLICATIONS

Guan, Le, et al. "Protecting private keys against memory disclosure attacks using hardware transactional memory." 2015 IEEE Symposium on Security and Privacy. IEEE, 2015. (Year: 2015).*

McKeen, Frank, et al. "Intel® software guard extensions (intel® sgx) support for dynamic memory management inside an enclave." Proceedings of the Hardware and Architectural Support for Security and Privacy 2016. ACM, 2016. (Year: 2016).*

Sau, Suman, et al. "Survey of secure processors." 2017 International Conference on Embedded Computer Systems: Architectures, Modeling, and Simulation (SAMOS). IEEE, 2017. (Year: 2017).*

Shih, Ming-Wei, et al. "T-SGX: Eradicating Controlled-Channel Attacks Against Enclave Programs." NDSS. 2017. (Year: 2017).*

Costan, Victor, and Srinivas Devadas. "Intel SGX Explained." IACR Cryptology ePrint Archive 2016.086 (2016): 1-118. (Year: 2016).*

* cited by examiner

METHOD AND APPARATUS FOR DETECTING SIDE-CHANNEL ATTACK

TECHNICAL FIELD

Embodiments of the present disclosure relate to the technical field of computers, specifically to the technical field of information security, and more particularly to a method and apparatus for detecting a side-channel attack.

BACKGROUND

A side-channel attack refers to an approach of attacking an electronic device exploiting leakage of side-channel information such as time consumption, power consumption or electromagnetic radiation during running of the electronic device. Due to its low cost and high cracking efficiency, the side-channel attack has posed a serious threat to the security of electronic devices.

To enhance the security of an electronic device, it is needed to timely detect whether a side-channel attack to the electronic device exists. Most of current side-channel attack detecting methods have to rely on additional hardware.

SUMMARY

Embodiments of the present disclosure provide a method and apparatus for detecting a side-channel attack.

In a first aspect, an embodiment of the present disclosure provides a method for detecting a side-channel attack, the method comprising: clearing data in a state save area of a target enclave; sequentially executing an instruction sequence in the target enclave; acquiring data in the state save area; and in response to determining that the acquired data in the state save area indicates that an asynchronous enclave exit with a cause of exception exit happens to the target enclave, determining that the side-channel attack to the target enclave exists.

In some embodiments, before sequentially executing the instruction sequence in the target enclave, the method further comprises: acquiring a value of a timestamp counter in a processor that executes the instruction sequence in the target enclave as an initial timestamp count; and subsequent to sequentially executing the instruction sequence in the target enclave, the method further comprises: acquiring a value of the timestamp counter as an end timestamp count; and in response to determining that a difference between the end timestamp count and the initial timestamp count is greater than a preset total execution timestamp count threshold value corresponding to the target enclave, determining that the side-channel attack to the target enclave exists.

In some embodiments, the instruction sequence includes at least one critical instruction sub-sequence.

In some embodiments, the sequentially executing the instruction sequence in the target enclave comprises: for each critical instruction sub-sequence in the at least one critical instruction sub-sequence, executing a detecting step comprising: acquiring a value of the timestamp counter as a pre-execution timestamp count corresponding to the critical instruction sub-sequence; executing the critical instruction sub-sequence; acquiring a value of the timestamp counter as a post-execution timestamp count corresponding to the critical instruction sub-sequence; and in response to determining that an execution timestamp count corresponding to the critical instruction sub-sequence is greater than the preset execution timestamp count threshold value corresponding to the critical instruction sub-sequence, determining that the side-channel attack to the target enclave exists, wherein the execution timestamp count corresponding to the critical instruction sub-sequence is a difference resulting from the post-execution timestamp count corresponding to the critical instruction sub-sequence minus the pre-execution timestamp count corresponding to the critical instruction sub-sequence.

In some embodiments, the detecting step further comprises: acquiring data in the state save area after executing the critical instruction sub-sequence, and in response to determining that the acquired data in the state save area indicates that an asynchronous enclave exit with a cause of exception exit happens to the target enclave, determining that the side-channel attack to the target enclave exists.

In some embodiments, after clearing the data in the state save area of the target enclave, the method further comprises: setting an amount of exits to a preset number; and the detecting step further comprises: after acquiring the data in the state save area, in response to determining that the acquired data in the state save area indicates that an asynchronous enclave exit with a cause of interrupt exit happens to the target enclave, clearing the data in the state save area, and updating the amount of exits using a sum of the amount of exits and a preset increment; and in response to determining that the updated amount of exits is greater than a preset amount-of-exits threshold value corresponding to the target enclave, determining that the side-channel attack to the target enclave exists.

In some embodiments, the detecting step further comprises: after updating the amount of exits using the sum of the amount of exits and the preset increment, in response to determining that a ratio resulting from dividing the updated amount of exits by a timestamp count of exits is greater than a preset exit frequency threshold value corresponding to the target enclave, determining that the side-channel attack to the target enclave exists, wherein the timestamp count of exits is a difference resulting from the post-execution timestamp count corresponding to the critical instruction sub-sequence minus the initial timestamp count.

In some embodiments, the target enclave stores protected data, and the method further comprises: in response to determining that the side-channel attack to the target enclave exists, deleting the protected data stored in the target enclave, re-generating protected data, and storing the regenerated protected data in the target enclave.

In some embodiments, the method further comprises: in response to determining that the side-channel attack to the target enclave exists, generating and outputting prompt information, wherein the prompt information is for indicating that the side-channel attack to the target enclave exists.

In a second aspect, an embodiment of the present disclosure provides an apparatus for detecting a side-channel attack, the apparatus comprising: a clearing unit configured to clear data in a state save area of a target enclave; an executing unit configured to sequentially execute an instruction sequence in the target enclave; a first acquiring unit configured to acquire data in the state save area; and a first determining unit configured to, in response to determining that the acquired data in the state save area indicates that an asynchronous enclave exit with a cause of exception exit happens to the target enclave, determine that the side-channel attack to the target enclave exists.

In some embodiments, the apparatus further comprises: a second acquiring unit configured to, before sequentially executing the instruction sequence in the target enclave, acquire a value of a timestamp counter in a processor that executes the instruction sequence in the target enclave as an initial timestamp count; a third acquiring unit configured to, subsequent to sequentially executing the instruction sequence in the target enclave, acquire a value of the timestamp counter as an end timestamp count; and a second determining unit configured to, in response to determining that a difference between the end timestamp count and the initial timestamp count is greater than a preset total execution timestamp count threshold value corresponding to the target enclave, determine that the side-channel attack to the target enclave exists.

In some embodiments, the instruction sequence includes at least one critical instruction sub-sequence.

In some embodiments, the executing unit is further configured to: for each critical instruction sub-sequence in the at least one critical instruction sub-sequence, execute a detecting step comprising: acquiring a value of the timestamp counter as a pre-execution timestamp count corresponding to the critical instruction sub-sequence; executing the critical instruction sub-sequence; acquiring a value of the timestamp counter as a post-execution timestamp count corresponding to the critical instruction sub-sequence; and in response to determining that an execution timestamp count corresponding to the critical instruction sub-sequence is greater than the preset execution timestamp count threshold value corresponding to the critical instruction sub-sequence, determining that the side-channel attack to the target enclave exists, wherein the execution timestamp count corresponding to the critical instruction sub-sequence is a difference resulting from the post-execution timestamp count corresponding to the critical instruction sub-sequence minus the pre-execution timestamp count corresponding to the critical instruction sub-sequence.

In some embodiments, the detecting step further comprises: acquiring data in the state save area after executing the critical instruction sub-sequence, and in response to determining that the acquired data in the state save area indicates that an asynchronous enclave exit with a cause of exception exit happens to the target enclave, determining that the side-channel attack to the target enclave exists.

In some embodiments, the apparatus further comprises: a setting unit configured to set an amount of exits to a preset number; and the detecting step further comprises: after acquiring the data in the state save area, in response to determining that the acquired data in the state save area indicates that an asynchronous enclave exit with a cause of interrupt exit happens to the target enclave, clearing the data in the state save area, and updating the amount of exits using a sum of the amount of exits and a preset increment; and in response to determining that the updated amount of exits is greater than a preset amount-of-exits threshold value corresponding to the target enclave, determining that the side-channel attack to the target enclave exists.

In some embodiments, the detecting step further comprises: after updating the amount of exits using the sum of the amount of exits and the preset increment, in response to determining that a ratio resulting from dividing the updated amount of exits by a timestamp count of exits is greater than a preset exit frequency threshold value corresponding to the target enclave, determining that the side-channel attack to the target enclave exists, wherein the timestamp count of exits is a difference resulting from the post-execution timestamp count corresponding to the critical instruction sub-sequence minus the initial timestamp count.

In some embodiments, the target enclave stores protected data, and the apparatus further comprises: a data generating unit configured to, in response to determining that the side-channel attack to the target enclave exists, delete the protected data stored in the target enclave, re-generate protected data, and store the regenerated protected data in the target enclave.

In some embodiments, the apparatus further comprises: an information generating unit configured to, in response to determining that the side-channel attack to the target enclave exists, generate and output prompt information, wherein the prompt information is for indicating that the side-channel attack to the target enclave exists.

In a third aspect, an embodiment of the present disclosure provides an electronic device, the electronic device comprising: one or more processors; and storage means for storing one or more programs which, when being executed by the one or more processors, cause the one or more processors to implement the method described in any embodiment in the first aspect.

In a fourth aspect, an embodiment of the present disclosure provides a computer-readable storage medium having a computer program embodied thereon. The computer program, when being executed by the processor, implements the method described in any embodiment in the first aspect.

The method and apparatus for detecting a side-channel attack provided by the embodiments of the present disclosure realize side-channel attack detection for an enclave without additional hardware by clearing data in a state save area of a target enclave; then sequentially executing an instruction sequence in the target enclave; and then acquiring data in the state save area; and finally, in response to determining that the acquired data in the state save area indicates that an asynchronous enclave exit with a cause of exception exit happens to the target enclave, determining that the side-channel attack to the target enclave exists.

BRIEF DESCRIPTION OF THE DRAWINGS

Other features, objectives and advantages of the present disclosure will become more apparent through reading the detailed description of non-limiting embodiments with reference to the accompanying drawings.

DETAILED DESCRIPTION OF THE PREFERRED EMBODIMENTS

Hereinafter, the present disclosure will be described in further detail with reference to the accompanying drawings and the embodiments. It will be appreciated that the preferred embodiments described herein are only for illustration, rather than limiting the present disclosure. In addition, it should also be noted that for the ease of description, the drawings only illustrate those parts related to the present disclosure.

It needs to be noted that without conflicts, the embodiments in the present disclosure and the features in the embodiments may be combined with each other. Hereinafter, the present disclosure will be illustrated in detail with reference to the accompanying drawings in conjunction with the embodiments.

Figure 1:
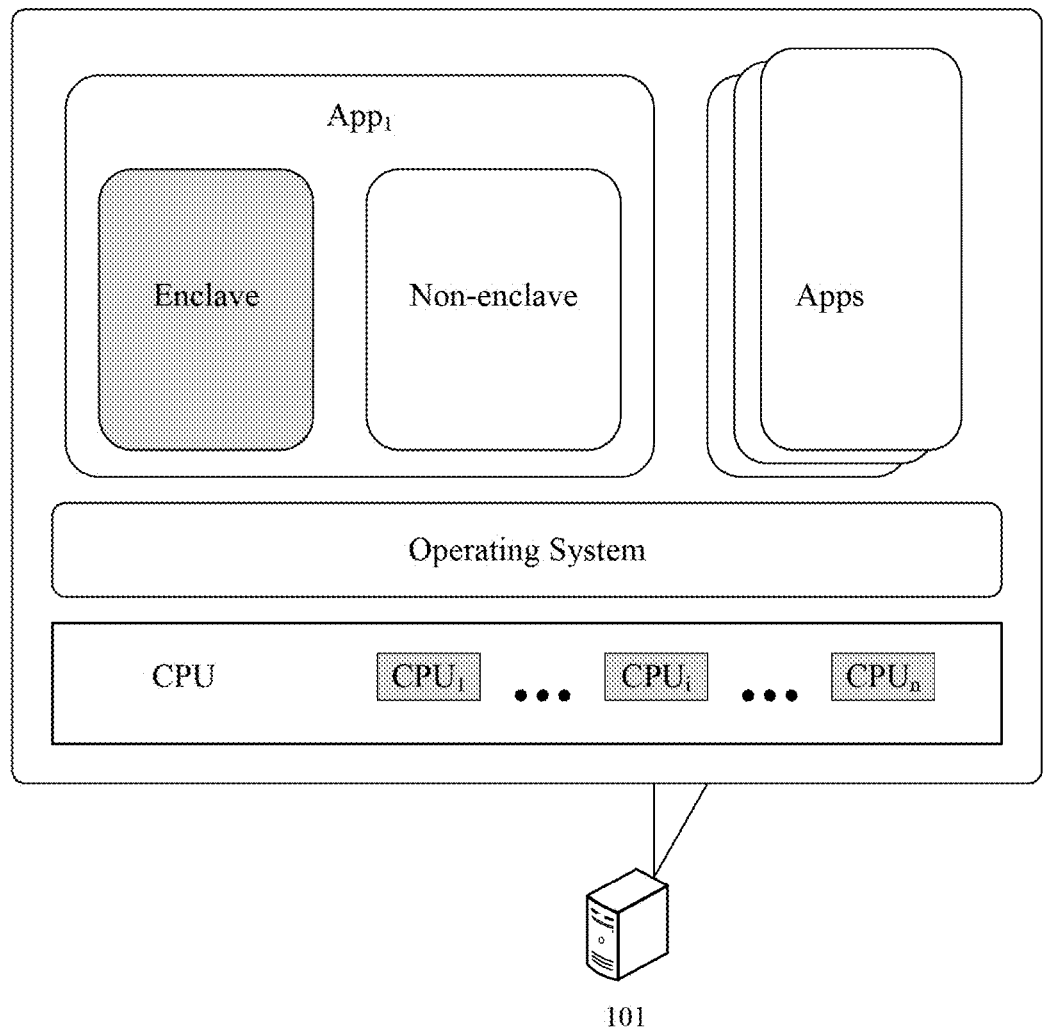
FIG. 1 is an exemplary system architecture diagram in which the present disclosure may be applied.

FIG. 1 illustrates an exemplary system architecture 100 in which an embodiment of a method for detecting a side-channel attack or an embodiment of an apparatus for detecting a side-channel attack in the present disclosure may be applied.

As illustrated in FIG. 1, the system architecture 100 may comprise an electronic device 101 that may include central processors CPU1, ..., CPUi, ..., CPUn, where n is a positive integer. For example, when n is 1, the electronic device 101 may include only one processor CPU1; when n is 2, the electronic device 101 may include two processors CPU1 and CPU2.

In the electronic device 101, an operating system (OS) may be installed.

In the electronic device 101, at least one application (App) may also be installed. In some applications are included two parts: an enclave and a non-enclave.

Grey parts in the electronic device 101 are trusted parts, including the central processors CPU1, ..., CPUi, ..., CPUn and the enclave part of respective applications.

It needs to be noted that the method for detecting a side-channel attack provided by an embodiment of the present disclosure is generally executed by the electronic device 101; correspondingly, the apparatus for detecting a side-channel attack is generally provided in the electronic device 101.

It should be appreciated that the number of processors, operating systems, applications and enclaves in FIG. 1 are only schematic. Any number of processors, operating systems, applications, and enclaves may be provided according to needs of implementation.

Figure 2:
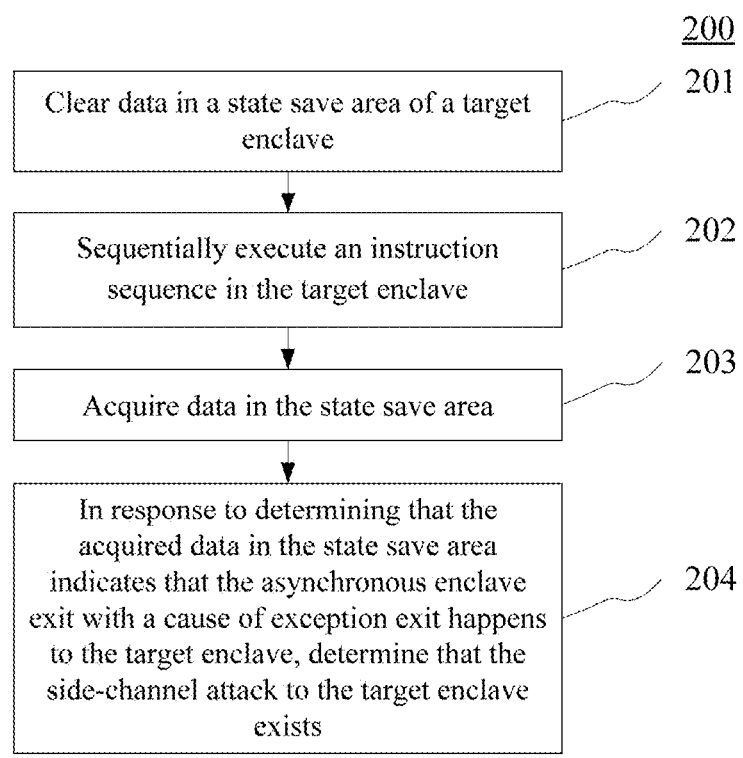
FIG. 2 is a flow chart of an embodiment of a method for detecting a side-channel attack according to the present disclosure.

Continue referring to FIG. 2, which shows a flow chart 200 of an embodiment of a method for detecting a side-channel attack according to the present disclosure. The embodiment mainly illustrates the method by applying the method to an electronic device having a certain computational capability. The method for detecting a side-channel attack comprises steps of:

Step 201: clearing data in a state save area of a target enclave.

The Intel SGX (Intel Software Guard Extensions) technology is a novel hardware-based trusted computing technology. The Intel SGX technology encapsulates secure operations of legal software into an enclave so as to guard it from being attacked by malicious software, such that a privileged or unprivileged software cannot access the enclave. In other words, once software and data are deposited in the enclave, even an operating system or a virtual machine monitor cannot have an effect on the codes and data in the state save area. In view that contents in the enclave cannot be directly read, an attacker proposes a considerable number of side-channel attacks to indirectly acquire the data (e.g., privacy data, a cryptographic key, etc.) in the enclave.

To protect security of the enclave, it is needed to timely detect whether a side-channel attack to the enclave exists. Current schemes of detecting a side-channel attack to the enclave mostly rely on specific hardware functions (e.g., having to rely on the Intel TSX (Transactional Synchronization Extensions)-enabled hardware); besides, they need to occupy a large amount of cache resources to store temporary information.

In this embodiment, an electronic device (e.g., the electronic device 101 shown in FIG. 1) on which the method for detecting a side-channel attack is executed may clear data in the state save area of the target enclave; after the clearing operation, no data exist in the state save area of the target enclave. Particularly, the electronic device may include at least one enclave, and the target enclave may be one enclave in the at least one enclave. Here, the method for detecting a side-channel attack is illustrated only with the target enclave as an example. It will be appreciated that the method for detecting a side-channel attack may be applied to each enclave in the at least one enclave.

Here, the state save area (SSA) of the enclave refers to a block of area in the enclave. The area may record relevant information upon an AEX (Asynchronous Enclave Exit) happening to the enclave. Here, relevant information may include: whether the AEX happens, and a cause of the AEX, etc. Particularly, a cause of exit for the AEX may be an exception exit or an interrupt exit.

Here, clearing the data in the state save area of the target enclave before detecting a side-channel attack to the enclave corresponds to a belief that no asynchronous enclave exit happens to the target enclave before detecting the side-channel attack to the enclave.

Step 202: sequentially executing an instruction sequence in the target enclave.

In this embodiment, executable codes and/or data may be stored in the target enclave. For example, the executable codes stored in the target enclave may be executable codes for handling the data stored in the target enclave. The instruction sequence in the target enclave refers to at least one sequentially-arranged instruction generated by loading the executable codes in the target enclave. In this way, the electronic device may sequentially execute the instruction sequence in the target enclave.

Step 203: acquiring data in the state save area.

In this embodiment, the electronic device may acquire data in the state save area of the target enclave, for subsequently determining whether the asynchronous enclave exit happens to the target enclave.

Step 204: in response to determining that the acquired data in the state save area indicates that the asynchronous enclave exit with a cause of exception exit happens to the target enclave, determining that the side-channel attack to the target enclave exists.

In this embodiment, the electronic device may determine whether the asynchronous enclave exit with a cause of exception exit happens to the target enclave based on the data in the state save area acquired in step 203; if determined yes, it may be determined that the side-channel attack to the target enclave exists.

In this embodiment, no exceptions will happen during a process of executing the instruction sequence in the target enclave without the side-channel attack. As an example, various kinds of exceptions may include at least one of: any memory reference or other guard exception, page fault exception, divide-by-zero exception, breakpoint exception, cross-border exception, invalid instruction exception, dual-fault exception, x87 floating point exception, alignment exception, and SIMD floating point exception, etc. For example, to guarantee that no page fault exception happens during the process of executing the instruction sequence in the enclave without a side-channel attack, a page table may be established before executing the instruction sequence in the target enclave, rather than applying for a page table on demand during the process of running the instruction sequence. For example, breakpoint instructions in the instruction sequence in the target enclave may be cleared before executing the instruction sequence in the target enclave, so as to guarantee that a debugging exception will not happen during the process of executing the instruction sequence in the target enclave without the side-channel attack. In this way, when detecting that the asynchronous enclave exit with the cause of exception exit happens to the target enclave, it indicates that the side-channel attack to the target enclave causes the asynchronous enclave exit with the cause of exception exit to happen to the target enclave; therefore, it may be determined that the side-channel attack to the target enclave exists.

In some optional implementations of this embodiment, protected data may be stored in the target enclave; the protected data in the target enclave is visible only to the processor and the target enclave per se, namely, only the processor and the target enclave per se may access the protected data in the target enclave. As an example, the protected data may include privacy data or key data, etc. Because the protected data is very important, its security may be enhanced by storing the protected data in the target enclave. However, if it has been detected that the side-channel attack to the target enclave exists, it indicates that the protected data in the target enclave will not be secure any longer. Therefore, the electronic device may delete the protected data stored in the target enclave after determining, in step 204, that the side-channel attack to the target enclave exists, regenerate protected data and store the regenerated protected data in the target enclave.

In some optional implementations of this embodiment, the electronic device may generate and output prompt information after determining, in step 204, that the side-channel attack to the target enclave exists, wherein the prompt information is for indicating that the side-channel attack to the target enclave exists. As an example, the prompt information may include at least one of: a text, an image, and an audio. After receiving the prompt information, a user of the electronic device may correspondingly perform a subsequent operation. For example, the user may terminate executing the instruction sequence in the target enclave.

The method provided by the embodiment of the present disclosure realizes side-channel attack detection for the enclave without additional hardware by clearing data in a state save area of a target enclave; sequentially executing an instruction sequence in the target enclave; acquiring data in the state save area; and in response to determining that the acquired data in the state save area indicates that an asynchronous enclave exit with a cause of exception exit happens to the target enclave, and determining that the side-channel attack to the target enclave exists.

Figure 3:
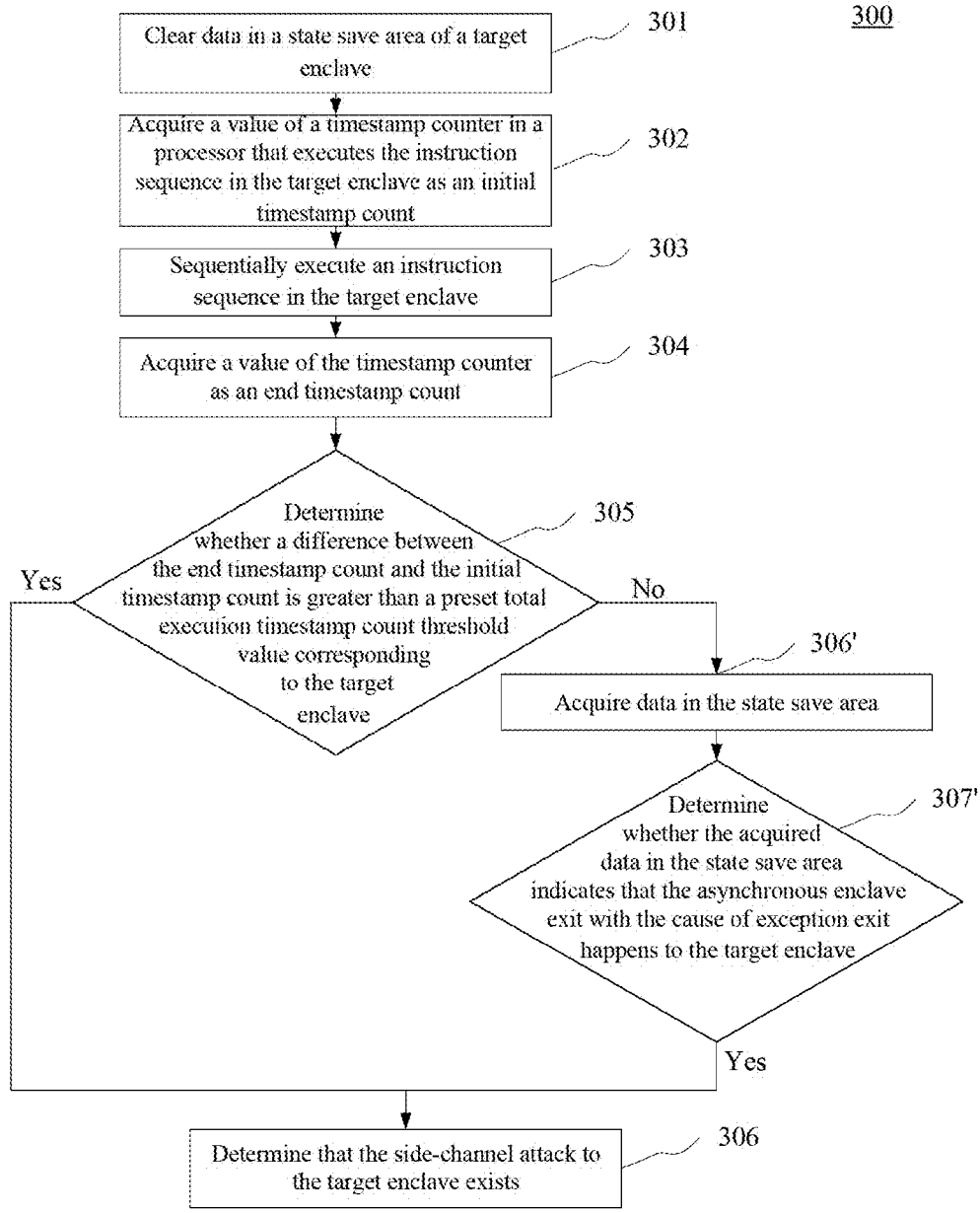
FIG. 3 is a flow chart of another embodiment of a method for detecting a side-channel attack according to the present disclosure.

Further referring to FIG. 3, shown is a flow chart 300 of another embodiment of a method for detecting a side-channel attack. The flow 300 of the method for detecting a side-channel attack comprises steps of:

Step 301: clearing data in a state save area of a target enclave.

In this embodiment, specific operations of step 301 are substantially identical to those of step 201 in the embodiment shown in FIG. 2, which will not be detailed here.

Step 302: acquiring a value of a timestamp counter in a processor that executes the instruction sequence in the target enclave as an initial timestamp count.

In this embodiment, an electronic device (e.g., the electronic device 101 shown in FIG. 1) on which the method for detecting a side-channel attack is executed may acquire, before executing an instruction sequence in the target enclave, a value of a timestamp counter (TSC) in the processor that executes the instruction sequence in the target enclave as an initial timestamp count.

As an example, the electronic device may acquire a value of a timestamp counter in a processor that executes an instruction sequence in the target enclave by executing a "rdtsc" or "rdtscp" instruction at a user mode.

In some optional implementations of this embodiment, the operating system installed in the electronic device may manage system resources as the highest privileged software. Namely, the electronic device does not support hardware virtualization, because the hardware virtualization may modify the value of the timestamp counter, causing the acquired value of the timestamp counter inaccurate.

Step 303: sequentially executing an instruction sequence in the target enclave.

In this embodiment, specific operations of the step 303 are identical to those of the step 202 in the embodiment shown in FIG. 2, which will not be detailed here.

Step 304: acquiring a value of the timestamp counter as an end timestamp count.

In this embodiment, the electronic device may acquire a value of the timestamp counter as an end timestamp count after executing the instruction sequence in the target enclave.

Step 305: determining whether a difference between the end timestamp count and the initial timestamp count is greater than a preset total execution timestamp count threshold value corresponding to the target enclave.

In this embodiment, the electronic device may first calculate a difference between the end timestamp count and the initial timestamp count; then determine whether the difference calculated is greater than the preset total execution timestamp count threshold value corresponding to the target enclave. If determined yes, the processing turns to step 306; if determined not, the processing turns to step 306'.

Here, the electronic device may pre-store a preset total execution timestamp count threshold value corresponding to the target enclave, wherein the preset total execution timestamp count threshold value corresponding to the target enclave may be preset by a technician for the target enclave or may be derived by the electronic device pre-executing a step of determining the total execution timestamp count threshold value, wherein the step of determining the total execution timestamp count threshold value may be performed as follows:

First, the instruction sequence in the target enclave may be executed for multiple times, and before each time of executing the instruction sequence in the target enclave, a value of the timestamp counter in the processor that executes the instruction sequence in the target enclave is acquired as a first timestamp count; and after completely executing the instruction sequence in the target enclave, a value of the timestamp counter in the processor that executes the instruction sequence in the target enclave is acquired again as a second timestamp count; a difference resulting from the second timestamp count minus the first timestamp count is used as the execution total timestamp count of executing the instruction sequence in the target enclave at this time.

Then, the preset total execution timestamp count threshold value corresponding to the target enclave may be determined based on the execution total timestamp count of each time of executing the instruction sequence in the target enclave in the multiple times of executing the instruction sequence in the target enclave.

For example, a maximum execution total timestamp count among respective execution total timestamp counts of the multiple times of executing the instruction sequence in the target enclave may be used as the preset total execution timestamp count threshold value corresponding to the target enclave.

For another example, the preset total execution timestamp count threshold value corresponding to the target enclave may also be determined using a statistical rule based on respective execution total timestamp counts of the multiple times of executing the instruction sequences in the target enclave. As an example, the respective execution total timestamp counts of the multiple times of executing the instruction sequence in the target enclave may be sorted in an ascending order, and a quantile operation of a first preset number (e.g., 10) based on the sorting result is performed to generate the first preset number of quantile results, and then a first preset quantile (e.g., 90%) quantile result of the first preset number of quantile results is determined as the preset total execution timestamp count threshold value corresponding to the target enclave.

Step 306: determining that the side-channel attack to the target enclave exists.

In this embodiment, the electronic device may determine that the side-channel attack to the target enclave exists if it is determined in step 305 that the difference between the end timestamp count and the initial timestamp count is greater than the preset total execution timestamp count threshold value corresponding to the target enclave, or if it is determined in step 307' that the acquired data in the state save area indicates that the asynchronous enclave exit with the cause of exception exit happens to the target enclave.

In this embodiment, the processor that executes the instruction sequence may always work at the highest frequency of the processor during the period of sequentially executing the instruction sequence in the target enclave, and the processor that pre-executes the step of determining the total execution timestamp count threshold valve may also work at the highest frequency during the process of executing the step of determining the total execution timestamp count threshold value, so as to guarantee no causing of increase of the execution time of executing the instruction sequence in the target enclave due to decrease of the working frequency of the processor that executes the instruction sequence, which further causes the difference between the end timestamp count and the initial timestamp count to be greater than the preset total execution timestamp count threshold value corresponding to the target enclave, and further causes a determination that the side-channel attack to the target enclave exists.

Step 306': acquiring data in the state save area.

In this embodiment, the electronic device may acquire data in the state save area of the target enclave if it is determined in step 305 that the difference between the end timestamp count and the initial timestamp count is not greater than the preset total execution timestamp count threshold value corresponding to the target enclave. The processing turns to step 307' after completion of the step 306'.

Step 307': determining whether the acquired data in the state save area indicates that the asynchronous enclave exit with the cause of exception exit happens to the target enclave.

In this embodiment, the electronic device may determine whether the data in the state save area acquired in step 306' indicates that the asynchronous enclave exit with a cause of exception exit happens to the target enclave; if determined yes, the processing turns to step 306.

It may be seen in FIG. 3 that compared with the embodiment corresponding to FIG. 2, the flow 300 of the method for detecting a side-channel attack in this embodiment includes additional steps of acquiring a value of the timestamp counter as an initial timestamp count before executing the instruction sequence in the target enclave, acquiring a value of the timestamp counter as an end timestamp count after executing the instruction sequence in the target enclave, and if it is determined that the difference between the end timestamp count and the initial timestamp count is greater than the preset total execution timestamp count threshold value corresponding to the target enclave, determining that the side-channel attack to the target enclave exists. Therefore, a solution described in this embodiment may introduce an execution time of the instruction sequence in the target enclave, thereby realizing a more comprehensive detection of the side-channel attack to the target enclave.

Figure 4:
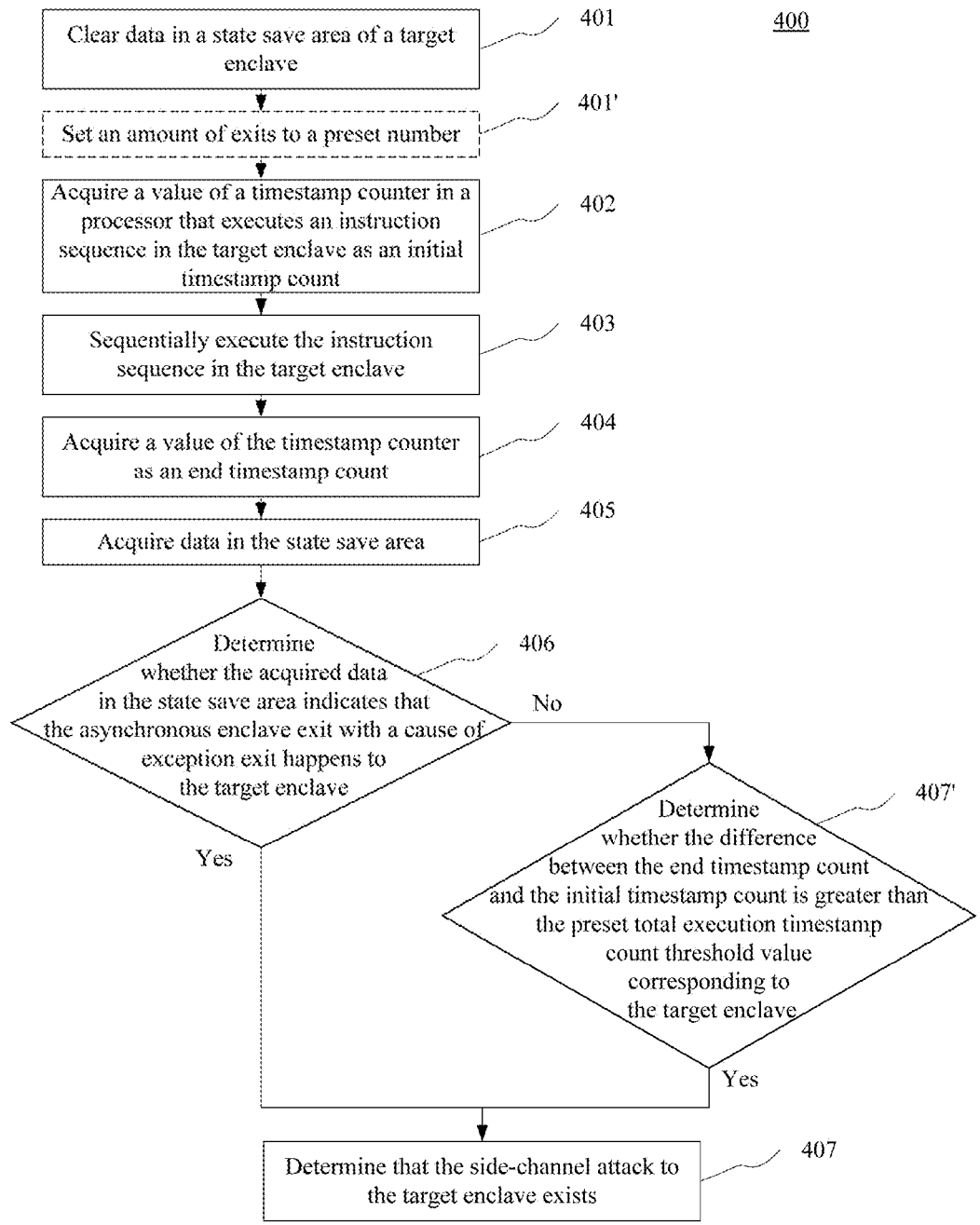
FIG. 4 is a flow chart of a further embodiment of a method for detecting a side-channel attack according to the present disclosure.

Further refer to FIG. 4, which shows a flow 400 of a method for detecting a side-channel attack according to a further embodiment. The flow 400 of the method for detecting a side-channel attack comprises steps of:

Step 401: clearing data in a state save area of a target enclave.

In this embodiment, specific operations of step 401 are substantially identical to the operations of step 301 in the embodiment shown in FIG. 3, which will not be detailed here.

Step 402: acquiring a value of a timestamp counter in a processor that executes an instruction sequence in the target enclave as an initial timestamp count.

In this embodiment, specific operations of step 402 are substantially identical to the operations of step 302 in the embodiment shown in FIG. 3, which will not be detailed here.

Step 403: sequentially executing the instruction sequence in the target enclave.

In this embodiment, executable codes and/or data may be stored in the target enclave. The instruction sequence in the target enclave refers to at least one sequentially-arranged instruction generated by loading the executable codes in the target enclave. Particularly, the instruction sequence in the target enclave may include at least one critical instruction sub-sequence.

In some optional implementations of this embodiment, the instruction sequence in the target enclave may only include at least one critical instruction sub-sequence, and does not include non-critical instruction sub-sequence.

In some optional implementations of this embodiment, the instruction sequence in the target enclave may include at least one non-critical instruction sub-sequence besides at least one critical instruction sub-sequence.

Particularly, the critical instruction sub-sequence may refer to at least one sequentially-arranged instruction which are involved in operations on sensitive data. For example, the sensitive data may refer to protected data stored in the target enclave. As an example, the operations on the sensitive data may refer to: reading a key stored in the target enclave, encrypting or decrypting the protected data stored in the target enclave, and reading a username and a password stored in the target enclave, etc.

Particularly, the non-critical instruction sequence may refer to at least one sequentially-arranged instruction which is not involved in operations on the sensitive data. As an example, the operations involved with the non-critical instruction sub-sequence may refer to: obtaining a text length, segmenting the text or outputting data, etc.

Figure 5:
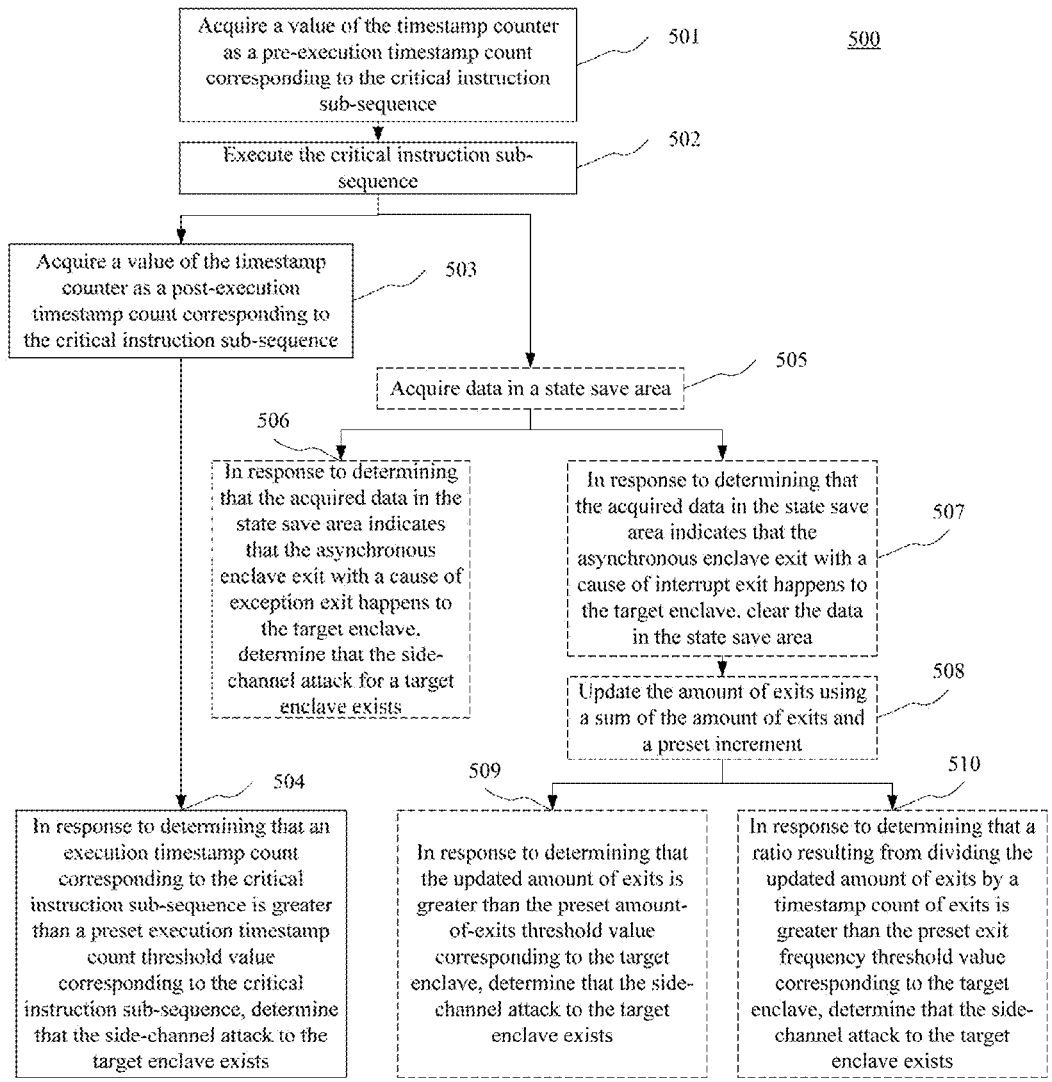
FIG. 5 is a flow chart of an embodiment of a detecting step according to the present disclosure.

In this embodiment, the electronic device may sequentially execute the critical instruction sub-sequence and non-critical instruction sub-sequence in the instruction sequence in the target enclave. Particularly, because the critical instruction sub-sequence is involved in operations on the sensitive data, it is more susceptible to a side-channel attack. In this regard, the electronic device may perform a detecting step for each critical instruction sub-sequence in at least one critical instruction sub-sequence included in the instruction sequence in the target enclave during a process of sequentially executing the critical instruction sub-sequence and non-critical instruction sub-sequence in the instruction sequence in the target enclave. Please refer to FIG. 5, which shows a flow 500 of an embodiment of the detecting step. The detecting step comprises steps of:

Step 501: acquiring a value of the timestamp counter as a pre-execution timestamp count corresponding to the critical instruction sub-sequence.

Here, the electronic device may acquire, before executing the critical instruction sub-sequence, a value of the timestamp counter in the processor that executes the critical instruction sub-sequence as a pre-execution timestamp count corresponding to the critical instruction sub-sequence.

Step 502: executing the critical instruction sub-sequence.

Step 503: acquiring a value of the timestamp counter as a post-execution timestamp count corresponding to the critical instruction sub-sequence.

Step 504: in response to determining that an execution timestamp count corresponding to the critical instruction sub-sequence is greater than a preset execution timestamp count threshold value corresponding to the critical instruction sub-sequence, determining that the side-channel attack to the target enclave exists.

Particularly, the execution timestamp count corresponding to the critical instruction sub-sequence refers to a difference resulting from the post-execution timestamp count corresponding to the critical instruction sub-sequence minus the pre-execution timestamp count corresponding to the critical instruction sub-sequence.

Here, for each critical instruction sub-sequence in the instruction sequence in the target enclave, a preset timestamp count threshold value corresponding to the critical instruction sub-sequence may be pre-stored in the electronic device, wherein the preset timestamp count threshold value corresponding to each critical instruction sub-sequence in the instruction sequence in the target enclave may be pre-set by a technician for the each critical instruction sub-sequence, or may be derived by the electronic device pre-executing, for the each critical instruction sub-sequence in the instruction sequence in the target enclave, the step of determining the timestamp count threshold value, wherein the step of determining the timestamp count threshold value may be carried out as follows:

First, the critical instruction sub-sequence may be executed for multiple times; before each time of executing the critical instruction sub-sequence, a value of the timestamp counter in the processor that executes the critical instruction sub-sequence is acquired as a third timestamp count, and a value of the timestamp counter in the processor that executes the critical instruction sub-sequence is acquired again as a fourth timestamp count after completely executing the critical instruction sub-sequence; and a difference resulting from the fourth timestamp count minus the third timestamp count is used as the execution timestamp count for this time of executing the critical instruction sub-sequence.

Then, a preset timestamp count threshold value corresponding to the critical instruction sub-sequence may be determined based on the execution timestamp count for each time of executing the critical instruction sub-sequence in multiple times of executing the critical instruction sub-sequence.

For example, a maximum execution timestamp count among the respective execution timestamp counts for the multiple times of executing the critical instruction sub-sequences may be used as the preset timestamp count threshold value corresponding to the critical instruction sub-sequence.

For another example, the preset timestamp count threshold value corresponding to the critical instruction sub-sequence may also be determined using a statistical rule based on the respective execution timestamp counts of the critical instruction sub-sequence. As an example, the respective execution timestamp counts for the multiple times of executing the critical instruction sub-sequence may be sorted in an ascending order, and a quantile operation on a second preset number (e.g., 10) is performed based on the sorting result to generate the second preset number of quantile results; then the second preset quantile (e.g., 90%) quantile result of the second preset number of quantile results is determined as the preset timestamp count threshold value corresponding to the critical instruction sub-sequence.

In some optional implementations of this embodiment, the detecting step 500 may also comprise:

executing step 505 and step 506 below after the step 502 are executed:

Step 505: acquiring data in a state save area.

Step 506: in response to determining that the acquired data in the state save area indicates that the asynchronous enclave exit with a cause of exception exit happens to the target enclave, determining that the side-channel attack for a target enclave exists.

In some optional implementations of this embodiment, the electronic device may also perform step 401' below after step 401:

Step 401': setting an amount of exits to a preset number.

For example, the amount of exits may be set to 0, i.e., corresponding to initializing the amount of exits to a preset number before executing the instruction sequence in the target enclave.

Based on execution of the step 401', the detecting step 500 may also comprise:

executing subsequent step 507, step 508, and step 509 after the step 505:

Step 507: in response to determining that the acquired data in the state save area indicates that the asynchronous enclave exit with a cause of interrupt exit happens to the target enclave, clearing the data in the state save area.

Step 508: updating the amount of exits using a sum of the amount of exits and a preset increment.

For example, the preset increment may be 1. Namely, the amount of exits increases by 1 upon each detection of an interrupt exit.

Step 509: in response to determining that the updated amount of exits is greater than the preset amount-of-exits threshold value corresponding to the target enclave, determining that the side-channel attack to the target enclave exists.

In some optional implementations of this embodiment, the detecting step 500 may also comprise:

executing step 510 below after the step 508:

step 510: in response to determining that a ratio resulting from dividing the updated amount of exits by a timestamp count of exits is greater than the preset exit frequency threshold value corresponding to the target enclave, determining that the side-channel attack to the target enclave exists.

Particularly, the timestamp count of exits refers to a difference resulting from the post-execution timestamp count corresponding to the critical instruction sub-sequence minus the initial timestamp count.

Step 404: acquiring a value of the timestamp counter as an end timestamp count.

In this embodiment, specific operations of step 404 are substantially identical to the operations of the step 304 in the embodiment shown in FIG. 3, which will not be detailed here.

Step 405: acquiring data in the state save area.

In this embodiment, an electronic device (e.g., the electronic device 101 shown in FIG. 1) on which the method for detecting a side-channel attack is executed may acquire the data in the state save area of the target enclave.

Step 406: determining whether the acquired data in the state save area indicates that the asynchronous enclave exit with a cause of exception exit happens to the target enclave.

In this embodiment, the electronic device may determine whether the data in the state save area acquired in step 405 indicates that the asynchronous enclave exit with a cause of exception exit happens to the target enclave; if determined yes, the process turns to step 407; otherwise, turns to step 407'.

Step 407: determining that the side-channel attack to the target enclave exists.

In this example, the electronic device may determine that the side-channel attack to the target enclave exists if it is determined in step 406 that the acquired data in the state save area indicates that the asynchronous enclave exit with a cause of exception exit happens to the target enclave, or if it is determined in step 407' that a difference between the end timestamp count and the initial timestamp count is greater than the preset total execution timestamp count threshold value corresponding to the target enclave.

Step 407': determining whether the difference between the end timestamp count and the initial timestamp count is greater than the preset total execution timestamp count threshold value corresponding to the target enclave.

In this embodiment, when it is determined in step 406 that the acquired data in the state save area does not indicate that the asynchronous enclave exit with a cause of exception exit happens to the target enclave, the electronic device may first calculate the difference between the end timestamp count and the initial timestamp count; and then determine whether the calculated difference is greater than the preset total execution timestamp count threshold value corresponding to the target enclave; if determined yes, the process turns to step 407.

Here, the electronic device may pre-store the preset total execution timestamp count threshold value corresponding to the target enclave, wherein the specific depictions of the preset total execution timestamp count threshold value corresponding to the target enclave may also refer to relevant depictions in step 305 in the embodiment shown in FIG. 3, which will not be detailed here.

It may be seen from FIG. 4 that compared with the embodiment corresponding to FIG. 3, the flow 400 of the method for detecting a side-channel attack in this embodiment changes the sequence of determining whether the acquired data in the state save area indicates that the asynchronous enclave exit with a cause of exception exit happens to the target enclave and determining whether a difference between the end time stamp count and the initial timestamp count is greater than the preset total execution timestamp count threshold value corresponding to the target enclave, thereby realizing the side-channel attack detection for the target enclave in multiple ways. In addition, in the flow 400 of the method for detecting a side-channel attack in this embodiment, the step of detecting a side-channel attack for the critical instruction sub-sequence during the process of sequentially executing the instruction sequence in the target enclave is added, thereby realizing multi-level side-channel attack detection for the target enclave.

Figure 6:
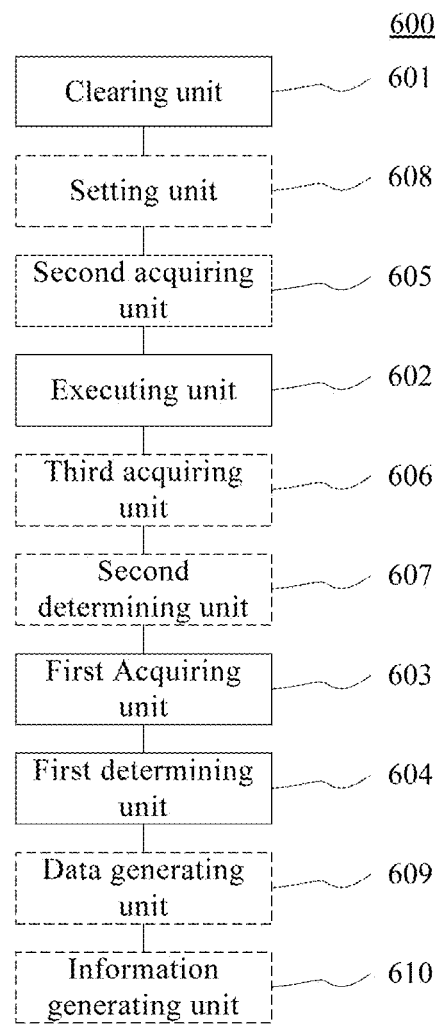
FIG. 6 is a structural schematic diagram of an embodiment of an apparatus for detecting a side-channel attack according to the present disclosure.

Further referring to FIG. 6, to implement the methods shown in the respective drawings above, the present disclosure provides an embodiment of an apparatus for detecting a side-channel attack. The apparatus embodiment corresponds to the method embodiment shown in FIG. 2, and the apparatus may be specifically applied to various electronic devices.

As shown in FIG. 6, the apparatus 600 for detecting a side-channel attack according to this embodiment comprises: a clearing unit 601, an executing unit 602, a first acquiring unit 603, and a first determining unit 604. Particularly, the clearing unit 601 is configured to clear data in a state save area of a target enclave; the executing unit 602 is configured to sequentially execute an instruction sequence in the target enclave; the first acquiring unit 603 is configured to acquire data in the state save area; and the first determining unit 604 is configured to, in response to determining that the acquired data in the state save area indicates that an asynchronous enclave exit with a cause of exception exit happens to the target enclave, determine that the side-channel attack to the target enclave exists.

In this embodiment, the specific processing and achieved technical effects of the clearing unit 601, the executing unit 602, the first acquiring unit 603, and the first determining unit 604 of the apparatus 600 for detecting a side-channel attack may refer to relevant illustrations of the step 201, the step 202, the step 203, and the step 204 in corresponding embodiments of FIG. 2 respectively, which will not be detailed here.

In some optional implementations of this embodiment, the apparatus 600 may also comprise: a second acquiring unit 605 configured to, before sequentially executing the instruction sequence in the target enclave, acquire a value of a timestamp counter in a processor that executes the instruction sequence in the target enclave as an initial timestamp count; and a third acquiring unit 606 configured to, subsequent to sequentially executing the instruction sequence in the target enclave, acquire a value of the timestamp counter as an end timestamp count; a second determining unit 607 configured to, in response to determining that a difference between the end timestamp count and the initial timestamp count is greater than a preset total execution timestamp count threshold value corresponding to the target enclave, determine that the side-channel attack to the target enclave exists. The specific processing and the achieved technical effects of the second acquiring unit 605, the third acquiring unit 606 and the second determining unit 607 may refer to relevant illustrations of the step 302, the step 304, the step 305, and the step 306 in corresponding embodiments of FIG. 3 respectively, which will not be detailed here.

In some optional implementations of this embodiment, the instruction sequence may include at least one critical instruction sub-sequence.

In some optional implementations of this embodiment, the executing unit 602 may be further configured to: for each critical instruction sub-sequence in the at least one critical instruction sub-sequence, execute a detecting step comprising: acquiring a value of the timestamp counter as a pre-execution timestamp count corresponding to the critical instruction sub-sequence; executing the critical instruction sub-sequence; acquiring a value of the timestamp counter as a post-execution timestamp count corresponding to the critical instruction sub-sequence; and in response to determining that an execution timestamp count corresponding to the critical instruction sub-sequence is greater than the preset execution timestamp count threshold value corresponding to the critical instruction sub-sequence, determining that the side-channel attack to the target enclave exists, wherein the execution timestamp count corresponding to the critical instruction sub-sequence is a difference resulting from the post-execution timestamp count corresponding to the critical instruction sub-sequence minus the pre-execution timestamp count corresponding to the critical instruction sub-sequence. The specific processing and the achieved technical effect of executing unit 602 may refer to relevant illustrations of step 403 in the corresponding embodiment of FIG. 4 and the corresponding embodiment of FIG. 5, which will not be detailed here.

In some optional implementations of this embodiment, the detecting step further comprises: acquiring data in the state save area after executing the critical instruction sub-sequence, and in response to determining that the acquired data in the state save area indicates that an asynchronous enclave exit with a cause of exception exit happens to the target enclave, determining that the side-channel attack to the target enclave exists. The specific processing and the achieved technical effect of the detecting step may refer to relevant depictions of the corresponding embodiment of FIG. 5, which will not be detailed here.

In some optional implementations of this embodiment, the apparatus 600 further comprises: a setting unit 608 configured to set an amount of exits to a preset number; and the detecting step may further comprise: after acquiring the data in the state save area, in response to determining that the acquired data in the state save area indicates that an asynchronous enclave exit with a cause of interrupt exit happens to the target enclave, clearing the data in the state save area, and updating the amount of exits using a sum of the amount of exits and a preset increment; and in response to determining that the updated amount of exits is greater than a preset amount-of-exits threshold value corresponding to the target enclave, determining that the side-channel attack to the target enclave exists. The specific processing and the achieved technical effect of the setting unit 608 may refer to relevant illustrations of step 401' in the corresponding embodiment of FIG. 4, which will not be detailed here.

In some optional implementations of this embodiment, the detecting step may further comprise: after updating the amount of exits using the sum of the amount of exits and the preset increment, in response to determining that a ratio resulting from dividing the updated amount of exits by a timestamp count of exits is greater than a preset exit frequency threshold value corresponding to the target enclave, determining that the side-channel attack to the target enclave exists, wherein the timestamp count of exits is a difference resulting from the post-execution timestamp count corresponding to the critical instruction sub-sequence minus the initial timestamp count. The specific processing and the achieved technical effect of the detecting step may refer to relevant illustrations of the corresponding embodiment of FIG. 5, which will not be detailed here.

In some optional implementations of this embodiment, the target enclave stores protected data, and the apparatus 600 may further comprise: a data generating unit 609 configured to, in response to determining that the side-channel attack to the target enclave exists, delete the protected data stored in the target enclave, re-generate protected data, and store the regenerated protected data in the target enclave. The specific processing and the achieved technical effect of the data generating unit 609 may refer to relevant illustrations of the corresponding embodiment of FIG. 2, which will not be detailed here.

In some optional implementations of this embodiment, the apparatus 600 may further comprise: an information generating unit 610 configured to, in response to determining that the side-channel attack to the target enclave exists, generate and output prompt information, wherein the prompt information is for indicating that the side-channel attack to the target enclave exists. The specific processing and the achieved technical effect of the information generating unit 610 may refer to relevant illustrations of the corresponding embodiment of FIG. 2, which will not be detailed here.

Hereinafter, refer to FIG. 7, which shows a structural schematic diagram of a computer system 700 of an electronic device adapted to implement the embodiments of the present disclosure. The electronic device shown in FIG. 7 is only an example, which should not bring about any limitation to the function or scope of the embodiments of the present disclosure.

Figure 7:
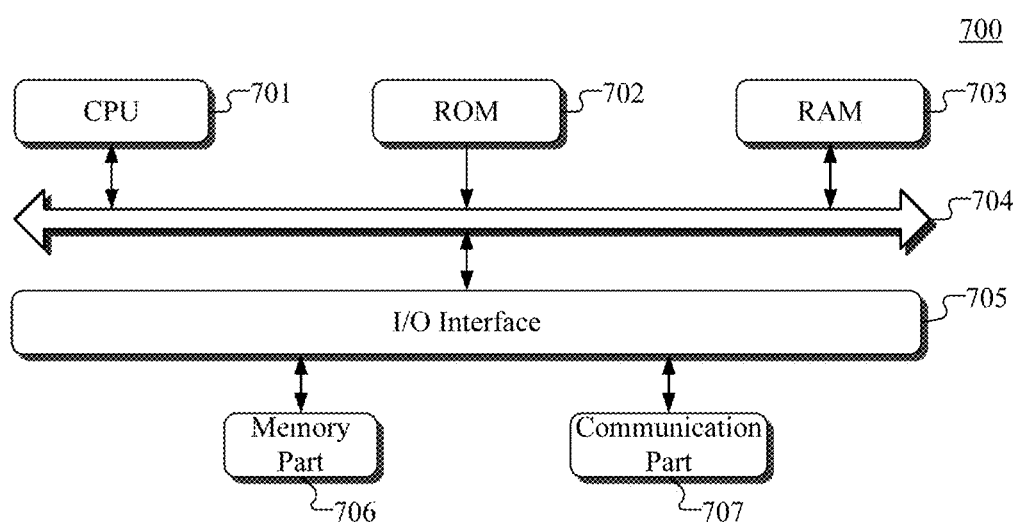
FIG. 7 is a structural schematic diagram of a computer system of an electronic device adapted to implement the embodiments of the present disclosure.

As shown in FIG. 7, the computer system 700 comprises a central processing unit (CPU) 701 which may perform various kinds of appropriate actions and processing according to computer program stored in a read-only memory (ROM) 702 or computer program loaded into the random-access memory (RAM) 703 from a memory part 706. In RAM 703, there may also store various kinds of programs and data needed for operations of the system 700. CPU 701, ROM 702, and RAM 703 are connected with each other via a bus 704. The input/output (I/O) interface 705 may also be connected to the bus 704.

A plurality of components are connected to the I/O interface 705, comprising: a memory part 706 including a hard disk, etc.; and a communication part 707 including a network interface card such as a LAN (Local Area Network) card, a modem, etc. The communication part 707 performs communication processing via a network such as the Internet.

Particularly, according to the embodiments of the present disclosure, the processes described above with reference to the flow charts may be implemented as computer software programs. For example, an embodiment of the present disclosure includes a computer program product that has a computer program embodied on a computer-readable medium, the computer program containing program codes for executing the method shown in the flow chart. In such an embodiment, the computer programs may be downloaded and installed from a network through the communication part 707. When being executed by the central processing unit (CPU) 701, the computer programs execute the functions limited in the method of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program codes are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system or used in combination therewith, apparatus or device. The program codes embodied on the computer-readable medium may be transmitted using any appropriate medium, including, but not limited to: wireless, wired, cable, RF, etc., or any appropriate combination thereof.

The flow charts and block diagrams in the drawings illustrate system architectures, functions, and operations possibly implemented by the system, method, and computer program product of various embodiments of the present disclosure. At this point, each block in the flow charts or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks actually may be executed substantially in parallel, and they may be sometimes executed in a reverse order, dependent on the functions involved. It should also be noted that each block in the block diagrams and/or flow charts and a combination of blocks in the block diagrams and/or flow diagrams may be implemented by a specific hardware-based system for executing a prescribed function or operation, or may be implemented by a combination of specific hardware and computer instructions.

The units mentioned in the description of the embodiments of the present disclosure may be implemented in a software manner or in a hardware manner. The described units may be disposed in a processor, for example may be described as: a processor comprising a clearing unit, an executing unit, a first acquiring unit, and a first determining unit, wherein names of these units do not constitute limitations to the units per se in certain circumstances, for example, the clearing unit may also be described as "a unit that clears data in a state save area of the target enclave."

In another aspect, the present disclosure further provides a computer-readable medium. The computer-readable medium may be included in the apparatus described in the embodiments; or may be separately provided, without being installed in the apparatus. The computer-readable medium carries one or more programs that, when being executed by the apparatus, cause the apparatus to: clear data in a state save area of a target enclave; sequentially execute an instruction sequence in the target enclave; acquiring data in the state save area; and in response to determining that the acquired data in the state save area indicates that an asynchronous enclave exit with a cause of exception exit happens to the target enclave, determine that the side-channel attack to the target enclave exists.

What have been described above are only preferred embodiments of the present disclosure and an illustration of the technical principle as exerted. Those skilled in the art should understand, the scope of the invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A method for detecting a side-channel attack, comprising:
   removing all data in an existing state save area of a target enclave to acquire an empty state save area;
   sequentially executing an instruction sequence in the target enclave, and using the empty state save area to record relevant information upon an asynchronous enclave exit happening to the target enclave during executing the instruction sequence in the target enclave;
   acquiring data recorded by the empty state save area; and
   in response to determining that the acquired data recorded by the empty state save area indicates that the asynchronous enclave exit with a cause of exception exit happens to the target enclave, determining that the side-channel attack to the target enclave exists.

2. The method according to claim 1, wherein
   before sequentially executing the instruction sequence in the target enclave, the method further comprises:
      acquiring a value of a timestamp counter in a processor that executes the instruction sequence in the target enclave as an initial timestamp count; and
   subsequent to sequentially executing the instruction sequence in the target enclave, and
   wherein the method further comprises:
      acquiring a value of the timestamp counter as an end timestamp count; and
      in response to determining that a difference between the end timestamp count and the initial timestamp count is greater than a preset total execution timestamp count threshold value corresponding to the target enclave, determining that the side-channel attack to the target enclave exists.

3. The method according to claim 2, wherein the instruction sequence includes at least one critical instruction sub-sequence.

4. The method according to claim 3, wherein the sequentially executing the instruction sequence in the target enclave comprises: for each critical instruction sub-sequence in the at least one critical instruction sub-sequence, executing a detecting step comprising: acquiring a value of the timestamp counter as a pre-execution timestamp count corresponding to the critical instruction sub-sequence; executing the critical instruction sub-sequence; acquiring a value of the timestamp counter as a post-execution timestamp count corresponding to the critical instruction sub-sequence; and in response to determining that an execution timestamp count corresponding to the critical instruction sub-sequence is greater than the preset execution timestamp count threshold value corresponding to the critical instruction sub-sequence, determining that the side-channel attack to the target enclave exists, wherein the execution timestamp count corresponding to the critical instruction sub-sequence is a difference resulting from the post-execution timestamp count corresponding to the critical instruction sub-sequence minus the pre-execution timestamp count corresponding to the critical instruction sub-sequence.

5. The method according to claim 4, wherein the detecting step further comprises: acquiring data in the state save area after executing the critical instruction sub-sequence, and in response to determining that the acquired data in the state save area indicates that an asynchronous enclave exit with a cause of exception exit happens to the target enclave, determining that the side-channel attack to the target enclave exists.

6. The method according to claim 5, wherein: after removing all the data in the state save area of the target enclave, setting an amount of exits to a preset number; and wherein the detecting step further comprises:
after acquiring the data recorded by the empty state save area, in response to determining that the acquired data recorded by the empty state save area indicates that an asynchronous enclave exit with a cause of interrupt exit happens to the target enclave, clearing the data in the state save area, and updating the amount of exits using a sum of the amount of exits and a preset increment; and in response to determining that the updated amount of exits is greater than a preset amount-of-exits threshold value corresponding to the target enclave, determining that the side-channel attack to the target enclave exists.

7. The method according to claim 6, wherein the detecting step further comprises: after updating the amount of exits using the sum of the amount of exits and the preset increment, in response to determining that a ratio resulting from dividing the updated amount of exits by a timestamp count of exits is greater than a preset exit frequency threshold value corresponding to the target enclave, determining that the side-channel attack to the target enclave exists, wherein the timestamp count of exits is a difference resulting from the post-execution timestamp count corresponding to the critical instruction sub-sequence minus the initial timestamp count.

8. The method according to claim 7, wherein the target enclave stores protected data, and wherein the method further comprises: in response to determining that the side-channel attack to the target enclave exists, deleting the protected data stored in the target enclave, re-generating protected data, and storing the regenerated protected data in the target enclave.

9. The method according to claim 7, wherein the method further comprises:
in response to determining that the side-channel attack to the target enclave exists, generating and outputting prompt information, wherein the prompt information is for indicating that the side-channel attack to the target enclave exists.

10. An apparatus for detecting a side-channel attack, comprising:
at least one processor; and
a memory storing instructions, wherein the instructions when executed by the at least one processor, cause the at least one processor to perform operations, the operations comprising:
removing all data in an existing state save area of a target enclave to acquire an empty state save area; sequentially executing an instruction sequence in the target enclave, and using the empty state save area to record relevant information upon an asynchronous enclave exit happening to the target enclave during executing the instruction sequence in the target enclave;
acquiring data recorded by the empty state save area; and
in response to determining that the acquired data recorded by the empty state save area indicates that the asynchronous enclave exit with a cause of exception exit happens to the target enclave, determining that the side-channel attack to the target enclave exists.

11. The apparatus according to claim 10, further comprises:
before sequentially executing the instruction sequence in the target enclave, the operations further comprise acquiring a value of a timestamp counter in a processor that executes the instruction sequence in the target enclave as an initial timestamp count;
subsequent to sequentially executing the instruction sequence in the target enclave, acquiring a value of the timestamp counter as an end timestamp count; and
in response to determining that a difference between the end timestamp count and the initial timestamp count is greater than a preset total execution timestamp count threshold value corresponding to the target enclave, determining that the side-channel attack to the target enclave exists.

12. The apparatus according to claim 11, wherein the instruction sequence includes at least one critical instruction sub-sequence.

13. The apparatus according to claim 12, wherein the sequentially executing the instruction sequence in the target enclave comprises for each critical instruction sub-sequence in the at least one critical instruction sub-sequence, executing a detecting step comprising:
acquiring a value of the timestamp counter as a pre-execution timestamp count corresponding to the critical instruction sub-sequence;
executing the critical instruction sub-sequence;
acquiring a value of the timestamp counter as a post-execution timestamp count corresponding to the critical instruction sub-sequence; and
in response to determining that an execution timestamp count corresponding to the critical instruction sub-sequence is greater than the preset execution timestamp count threshold value corresponding to the critical instruction sub-sequence, determining that the side-channel attack to the target enclave exists, and
wherein the execution timestamp count corresponding to the critical instruction sub-sequence is a difference resulting from the post-execution timestamp count corresponding to the critical instruction sub-sequence minus the pre-execution timestamp count corresponding to the critical instruction sub-sequence.

14. The apparatus according to claim 13, wherein the detecting step further comprises: acquiring data in the state save area after executing the critical instruction sub-sequence, and in response to determining that the acquired data in the state save area indicates that an asynchronous enclave exit with a cause of exception exit happens to the target enclave, determining that the side-channel attack to the target enclave exists.

15. The apparatus according to claim 14, wherein after removing all the data in the state save area of the target enclave, setting an amount of exits to a preset number; and wherein the operations further comprise:
after acquiring the recorded by the empty state save area, in response to determining that the acquired recorded by the empty state save area indicates that an asynchronous enclave exit with a cause of interrupt exit happens to the target enclave, clearing the data in the state save area, and updating the amount of exits using a sum of the amount of exits and a preset increment; and in response to determining that the updated amount of exits is greater than a preset amount-of-exits threshold value corresponding to the target enclave, determining that the side-channel attack to the target enclave exists.

16. The apparatus according to claim 15, wherein the detecting step further comprises: after updating the amount of exits using the sum of the amount of exits and the preset increment, in response to determining that a ratio resulting from dividing the updated amount of exits by a timestamp count of exits is greater than a preset exit frequency threshold value corresponding to the target enclave, determining that the side-channel attack to the target enclave exists, wherein the timestamp count of exits is a difference resulting from the post-execution timestamp count corresponding to the critical instruction sub-sequence minus the initial timestamp count.

17. The apparatus according to claim 16, wherein the target enclave stores protected data, and wherein the operations further comprise: in response to determining that the side-channel attack to the target enclave exists, deleting the protected data stored in the target enclave, re-generate protected data, and store the regenerated protected data in the target enclave.

18. The apparatus according to claim 16, wherein the operations further comprise:
in response to determining that the side-channel attack to the target enclave exists, generating and outputting prompt information, wherein the prompt information is for indicating that the side-channel attack to the target enclave exists.

19. A non-transitory computer-readable storage medium having a computer program embodied thereon, wherein the computer program, when being executed by a processor, causes the processor to:
removing all data in an existing state save area of a target enclave to acquire an empty state save area;
sequentially executing an instruction sequence in the target enclave, and using the empty state save area to record relevant information upon an asynchronous enclave exit happening to the target enclave during executing the instruction sequence in the target enclave;
acquire data recorded by the empty state save area; and
in response to determining that the acquired recorded by the empty state save area indicates that the asynchronous enclave exit with a cause of exception exit happens to the target enclave, determine that the side-channel attack to the target enclave exists.

20. The method according to claim 1, wherein: after removing all the data in the state save area of the target enclave, setting an amount of exits to a preset number; and wherein the method further comprises:
after acquiring the data recorded by the empty state save area, in response to determining that the acquired data recorded by the empty state save area indicates that an asynchronous enclave exit with a cause of interrupt exit happens to the target enclave, clearing the data in the state save area, and updating the amount of exits using a sum of the amount of exits and a preset increment; and in response to determining that the updated amount of exits is greater than a preset amount-of-exits threshold value corresponding to the target enclave, determining that the side-channel attack to the target enclave exists.

* * * * *

UNITED STATES PATENT AND TRADEMARK OFFICE
CERTIFICATE OF CORRECTION

| | |
|---|---|
| PATENT NO. | : 10,521,585 B2 |
| APPLICATION NO. | : 15/722834 |
| DATED | : December 31, 2019 |
| INVENTOR(S) | : Yueqiang Cheng |

Page 1 of 1

It is certified that error appears in the above-identified patent and that said Letters Patent is hereby corrected as shown below:

In the Claims

<u>Column 20, Line 66:</u>
Claim 15, "in response to determining that the acquired recorded by the empty state" should read, --in response to determining that the acquired data recorded by the empty state--.

<u>Column 22, Line 13:</u>
Claim 19, "in response to determining that the acquired recorded by the empty state" should read, --in response to determining that the acquired data recorded by the empty state--.

Signed and Sealed this
Sixth Day of October, 2020

Andrei Iancu
*Director of the United States Patent and Trademark Office*